Patented June 7, 1932

1,861,904

UNITED STATES PATENT OFFICE

RUDOLF BERENDES, OF ELBERFELD-SONNBORN, AND FRITZ MIETZSCH, OF ELBERFELD, GERMANY, ASSIGNORS TO WINTHROP CHEMICAL COMPANY, INC., OF NEW YORK, N. Y., A CORPORATION OF NEW YORK

DOUBLE COMPOUNDS OF DIPHENOL ISATINS AND QUINOLINE OR ISOQUINOLINE BASES

No Drawing. Application filed November 30, 1928, Serial No. 322,963, and in Germany December 2, 1927.

Our present invention relates to new double compounds of a 3.3-diphenolisatin with a quinoline or an isoquinoline base and to the process of preparing them, more particularly it relates to double compounds containing 2 mols of a quinoline or an isoquinoline base and 1 mol of a 3.3-diphenolisatin.

Our new products have pharmaceutically valuable properties. They are obtainable by reacting with a water soluble salt, preferably an alkali metal salt of a 3.3-diphenolisatin upon a salt, preferably a mineral acid salt, of such a base of the quinoline or isoquinoline series which possesses antispasmodic properties, in the presence of water. The term "a 3.3-diphenolisatin" is intended to include 3.3-diphenolisatin itself as well as substitution products thereof, such as 3.3-diphenol-5-methoxy-isatin, 3.3-diguaiacol-isatin, 3.3-diguaiacol-5.7-dichloro-isatin, and the like. Under the term "antispasmodic properties" we understand the effect of preventing or relieving spasms, i. e. any involuntary convulsive contractions of the normal muscular system. Quinoline or isoquinoline bases having antispasmodic properties are for instance the alkoxy-substitution products of these bases such as 6.8-dialkoxyquinolines, 6.7-dialkoxyisoquinolines, 1-veratryl-6.7-methylenedioxy-isoquinoline, papaverine and the like.

The reaction takes place generally already at room temperature on mixing the solution of 1 mol. of the 3.3-diphenolisatin compound in the calculated quantity of caustic alkali with the solution of 2 mols of the base in the calculated quantity of a diluted acid such as diluted hydrochloric acid, sulfuric acid, acetic acid or the like.

The probable course of the reaction (when using as starting materials for instance the sodium salt of 3.3-diphenolisatin and 6.8-diethoxyquinoline-hydrochloride) may be represented by the following equation:

The new compounds are usually white or pale yellowish substances insoluble in water, quite homogenous under the microscope, and frequently containing, when dried in the air, solvent of crystallization, which is slowly given up on heating. When using dialkoxy quinolines, which are remarkable for their strong odor and burning anæsthetizing taste (that is a taste similar to that which is produced on the tongue, for instance, by the hydrochloride of the para-aminobenzoic acid ester of diethylaminoethanol or by similar anæsthetics), the new compounds are distinguished from the mere mixtures of the starting components by their lack of smell and taste. In contradistinction to the synthetic aperients heretofore known, which in general are only to be prescribed for atonic constipation, the new compounds are also operative in cases of spasmodic constipation, a reliable uniform and painless aperient action being obtained in all cases.

The following examples are intended to illustrate the principles underlying our invention, which, of course, is not restricted thereto:—

*Example 1.*—15.85 grams of 3.3-diphenol-isatin, dissolved in 100 cc. of normal caustic soda, are added to a solution of 21.7 grams of 6.8-diethoxyquinoline in 100 cc. of normal hydrochloric acid. After a short time the deep yellow colored mixture becomes turbid and on stirring solidifies with loss of color, yielding finely a thick snow white and uniform crystal magma. The new compound may be represented by the following schematic formula:

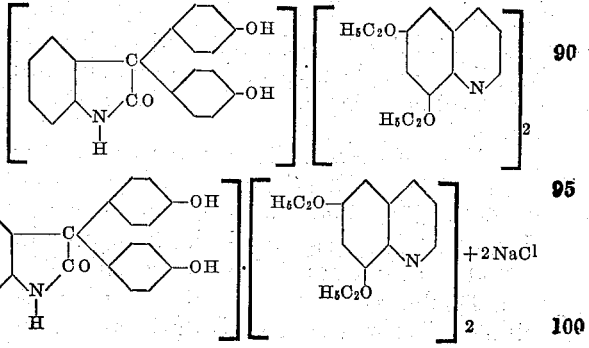

When dried in the air, the product contains water of crystallization which is slowly given up on heating. The double compound has not an exact melting point; on heating it sinters at a temperature of from about 75° C. and is completely molten only at 105° C. It has valuable antispasmodic properties.

*Example 2.*—15.85 grams of 3.3-diphenolisatin, dissolved in 100 cc. of normal caustic soda, are added to 37.6 grams of papaverine hydrochloride, dissolved in 400 cc. of water. After a short time the formation of the double compound is finished. The compound is obtained in the form of a white powder, containing water of crystallization. It may be represented by the following schematic formula:

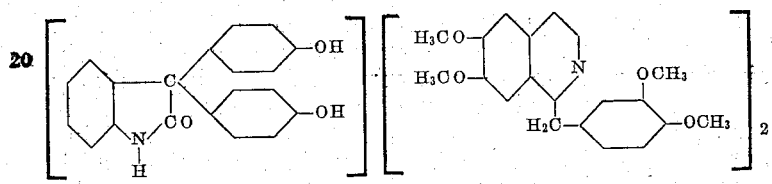

On heating it sinters at a temperature of from about 75° C. and is completely molten only at 116° C.

We claim:—

1. The process which comprises reacting with an alkali metal salt of a 3.3-diphenolisatin, upon a salt of a base of the group consisting of alkoxy-quinolines and alkoxy-isoquinolines and the alkoxybenzyl- and veratryl-substitution products thereof in the presence of water.

2. The process which comprises reacting with an alkali metal salt of a 3.3-diphenolisatin, upon a mineral acid salt of a base of the group consisting of alkoxy-quinolines and alkoxy-isoquinolines and the alkoxybenzyl- and veratryl-substitution products thereof in the presence of water.

3. The process which comprises reacting with 1 mol. of an alkali metal salt of a 3.3-diphenolisatin, upon 2 mols of a salt of a base of the group consisting of alkoxy-quinolines and alkoxyl-isoquinolines and the alkoxybenzyl- and veratryl-substitution products thereof in the presence of water.

4. The process which comprises reacting with 1 mol of an alkali metal salt of a 3.3-diphenolisatin, upon 2 mols of a mineral acid salt of a base of the group consisting of alkoxy-quinolines and alkoxy-isoquinolines and the alkoxybenzyl- and veratryl-substitution products thereof in the presence of water.

5. The process which comprises reacting with 15.85 gr. of 3.3-diphenolisatin, dissolved in 100 cc. of normal caustic soda, upon a solution of 21.7 grams of 6.8-diethoxyquinoline in 100 cc. of normal hydrochloric acid.

6. Double compounds of 1 mol of a 3.3-diphenolisatin with 2 mols of a base of the group consisting of alkoxy-quinolines and alkoxy-isoquinolines and the alkoxybenzyl- and veratryl-substitution products thereof, said compounds forming white to pale yellow powders insoluble in water, having valuable antispasmodic properties.

7. The double compound of 1 mol of 3.3-diphenolisatin with 2 mols of 6.8 diethoxyquinoline, said compound forming snow white crystals containing water of crystallization when dried in the air, sintering at about 75° C. and completely melting at 105° C. and having valuable antispasmodic properties.

8. The double compound of 1 mol of 3.3-diphenolisatin with two mols of papaverine, said compound forming a white powder, containing water of crystallization, sintering at about 75° C. and completely melting at 116° C. and having antispasmodic properties.

In testimony whereof we have hereunto set our hands.

RUDOLF BERENDES. [L. S.]
FRITZ MIETZSCH. [L. S.]